US010081126B2

(12) United States Patent
Bischer et al.

(10) Patent No.: US 10,081,126 B2
(45) Date of Patent: Sep. 25, 2018

(54) BLOW MOLD FOR MANUFACTURING CONTAINERS MADE OF THERMOPLASTIC MATERIAL

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Luigino Bischer, Conegliano (IT); Luca Della Pria, Vittorio Veneto (IT); David Gaiotti, Susegana (IT); Giada Peruzzo, Villorba (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 15/552,879

(22) PCT Filed: Feb. 25, 2016

(86) PCT No.: PCT/IB2016/051037
§ 371 (c)(1),
(2) Date: Aug. 23, 2017

(87) PCT Pub. No.: WO2016/135668
PCT Pub. Date: Sep. 1, 2016

(65) Prior Publication Data
US 2018/0043605 A1 Feb. 15, 2018

(30) Foreign Application Priority Data
Feb. 25, 2015 (IT) .............................. RM2015A0080

(51) Int. Cl.
*B29C 49/62* (2006.01)
*B29C 49/48* (2006.01)
(Continued)

(52) U.S. Cl.
CPC .......... *B29C 49/4815* (2013.01); *B29C 49/62* (2013.01); *B29C 49/08* (2013.01);
(Continued)

(58) Field of Classification Search
CPC .............. B29C 49/62; B29C 2049/627; B29C 2049/4879; B29C 2049/4892
See application file for complete search history.

(56) References Cited

U.S. PATENT DOCUMENTS

| 4,865,206 A * | 9/1989 | Behm ................. B65D 1/0284 215/375 |
| 6,660,216 B1 | 12/2003 | Porter |

(Continued)

FOREIGN PATENT DOCUMENTS

| FR | 2086554 A5 * | 12/1971 | ............. B29C 49/62 |
| WO | WO-2015092259 A1 * | 6/2015 | ............. B29C 49/48 |

OTHER PUBLICATIONS

International Preliminary Report on Patentability (IPRP) for Appl. No. PCT/IB2016/051037 by the International Bureau of WIPO, dated Jun. 6, 2016.

*Primary Examiner* — Robert B Davis
(74) *Attorney, Agent, or Firm* — Abelman, Frayne & Schwab

(57) ABSTRACT

A blow mold for making PET containers comprising an inner surface corresponding to the outer outline of the container, on which there are one or more cavities or projections configured to make corresponding respective projections or cavities of the outer surface of the container, wherein the mold comprises one or more venting grooves (Continued)

along the edge delimiting said cavities or projections. A plurality of venting holes are possibly arranged along such grooves, as well as it is also possible for some venting holes to be arranged outside thereof. The width and depth of these are selected according to the wall thickness of the container to be blown to prevent that the deformation of the container during the blowing obstructs the venting grooves and leaves visible marks on the container.

12 Claims, 3 Drawing Sheets

(51) Int. Cl.
    *B29C 49/08*     (2006.01)
    *B29K 67/00*     (2006.01)

(52) U.S. Cl.
    CPC ............ *B29C 2049/4805* (2013.01); *B29C 2049/4879* (2013.01); *B29C 2049/4892* (2013.01); *B29K 2067/003* (2013.01)

(56) References Cited

U.S. PATENT DOCUMENTS

| | | |
|---|---|---|
| 7,931,464 B2 | 4/2011 | Thierjung et al. |
| 2015/0061196 A1* | 3/2015 | Dachs .................. B29C 49/48 264/523 |
| 2015/0151869 A1 | 6/2015 | Dominguez et al. |
| 2015/0336320 A1 | 11/2015 | Poulat et al. |
| 2016/0332356 A1* | 11/2016 | Langlois .............. B29C 49/06 |

\* cited by examiner

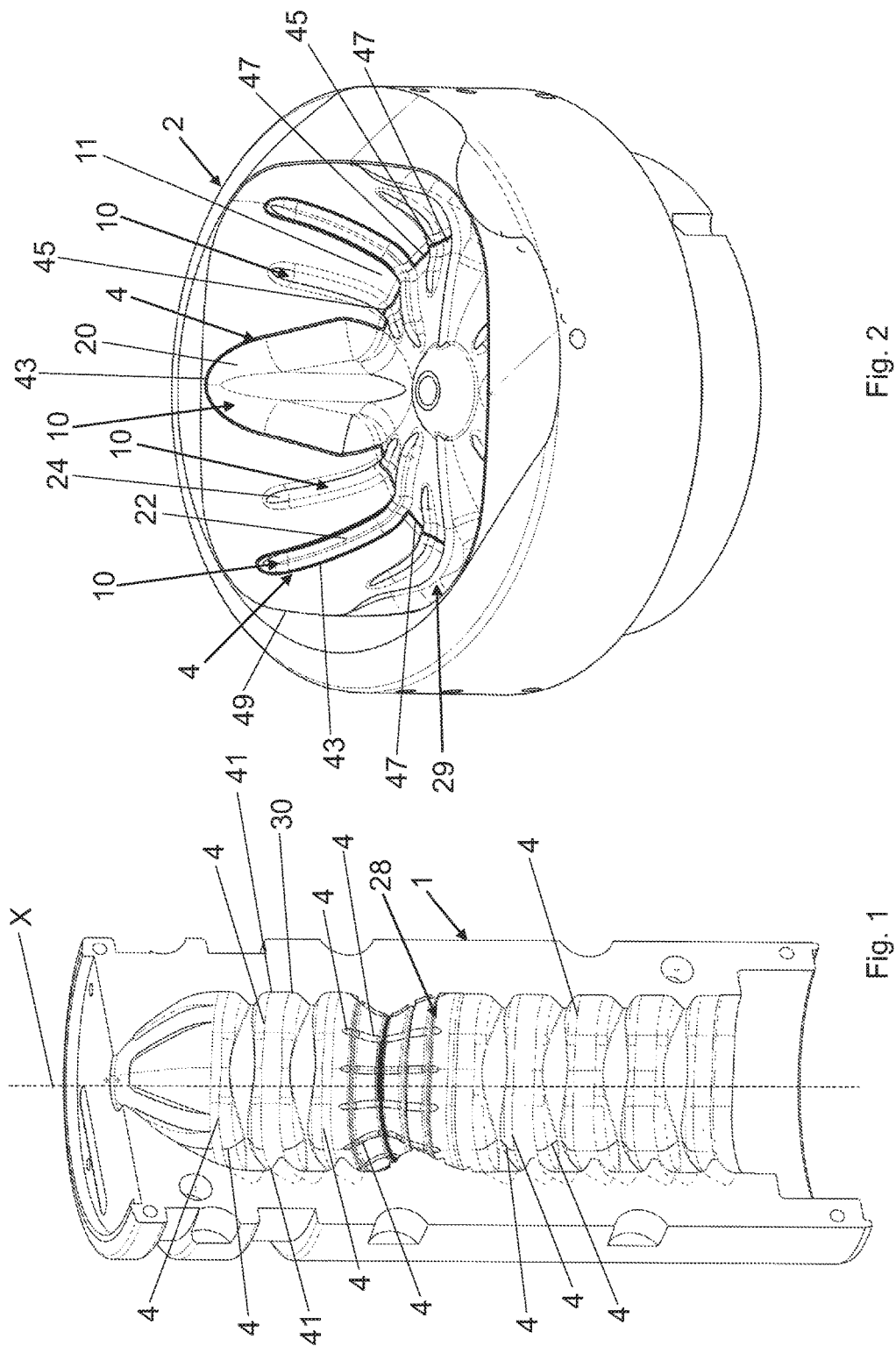

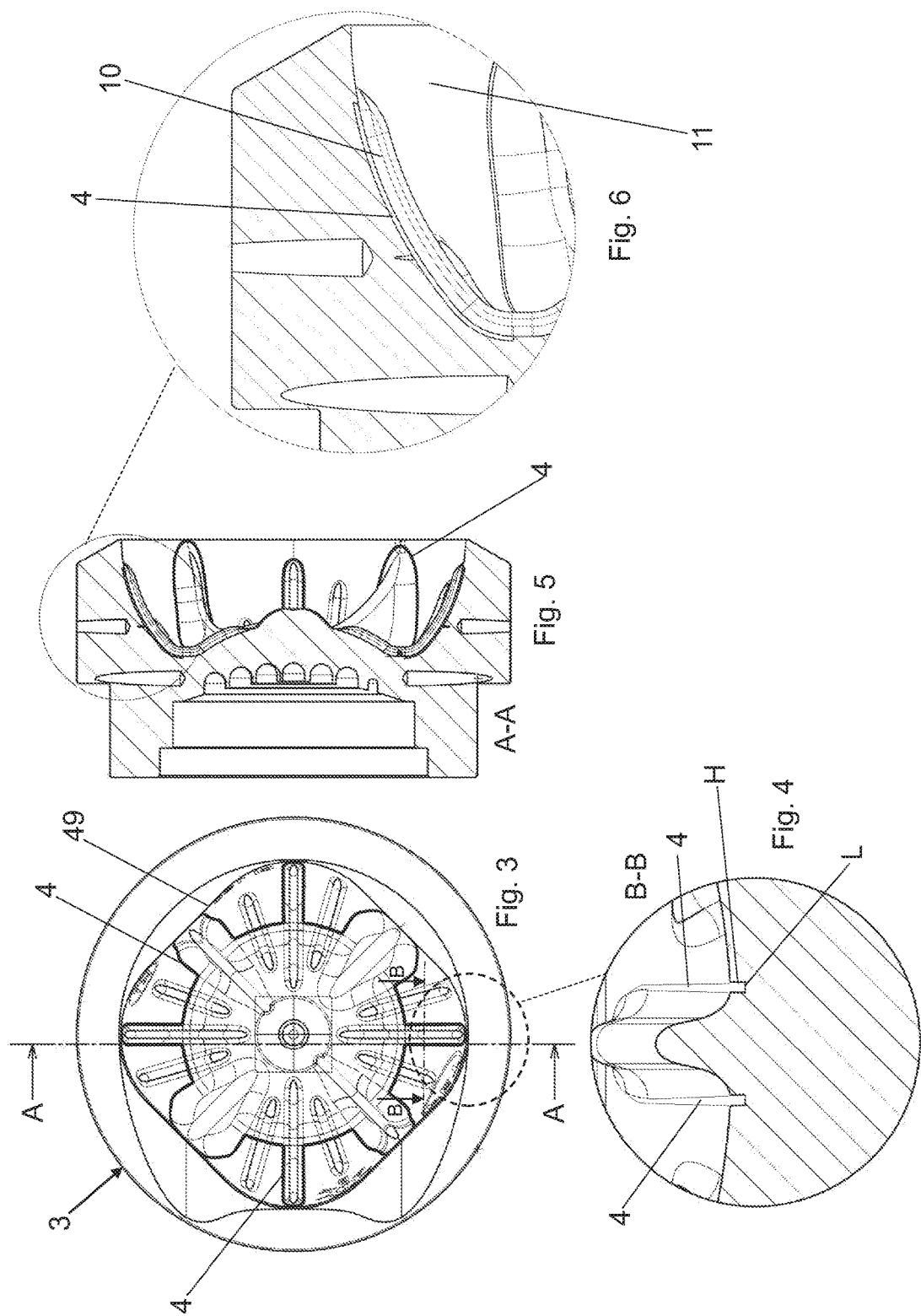

BLOW MOLD FOR MANUFACTURING CONTAINERS MADE OF THERMOPLASTIC MATERIAL

CROSS-REFERENCE TO RELATED APPLICATION

This application claims benefit under 35 U.S.C. § 371 to international application No. PCT/IB2016/051037, filed on Feb. 25, 2016, which claims priority to Italian application no. RM2015A000080, filed Feb. 25, 2015, the contents of which are incorporated by reference in their entireties.

FIELD OF THE INVENTION

The present invention relates to a blow mold for manufacturing containers made of thermoplastic material, e.g. made of PET.

BACKGROUND ART

The manufacturing of a high number of thermoplastic containers, in particular bottles, is a process which starting from the raw material—generally polyethylene terephtalate (PET)—allows to obtain finished containers of even particularly complex shape, which is suitable for the most varied needs of the market, and particularly lightweight and resistant even when subjected to strong pressures at ambient temperature.

The production process includes a passage of deforming a preform into the final plastic container by means of the stretching-blowing step in blow machines, which are generally provided with several blow molds, which determine the final shape of the finished containers.

Blow molding is preferred today also because it is particularly suitable for making hollow bodies having a complex shape and with several undercuts so as to meet the aesthetical needs of the market in addition to allowing the making of structural elements for reinforcing specific areas of the container, which increase the sturdiness thereof, albeit with very thin body walls. Blowing has the big advantage of also allowing the production of containers with a very large body with respect to the mouth, such as bottles and flasks. Blowing is a particularly fast and efficient production process, which is suitable for the production of containers on a large scale, such as are today's beverage bottles made of thermoplastic resins, and in particular made of PET, for which the market requires particularly high production numbers. Reduced cycle-times result in the cost of the plants being divided among several pieces, thus allowing productions to be reached which are also in the range of several tens of thousands of containers per hour in larger blowing plants.

These increased production ranges also require optimizing the blow molds, which have to ensure an optimal realization of containers having a rather complex shape. The danger in cases of this kind lies in the fact that the thermoplastic material does not adequately conform to the inner wall of the mold in certain areas during the blowing, for example to all the cavities on the inner wall of the mold, thus leaving imperfections on the body of the finished container. To ensure that the material properly adheres in all areas during the expansion thereof inside the mold, which is induced by blowing the air, series of venting holes are normally provided which communicate with the exterior of the mold to allow the air in the empty mold to be released while the container expands, thus conforming to the inner surface and occupying the whole space inside the mold. Holes of predetermined dimensions are made, which are designed to ensure the release of the quantity of air occupying the inside of the mold. If the holes have a very small diameter, there is a need to provide a greater number thereof to ensure the proper venting function, while if holes are provided having a larger diameter to reduce the number thereof, the risk exists that deformations which damage the appearance of the finished container remain on the surface of the final container.

However, the problem persists of the formation of air locks, even of small dimensions, between the inner wall of the mold and the outer wall of the expanding container, despite the use of such holes. To eliminate the air locks, there is a need to blow the container using high pressures of the blowing air. However, the use of high blowing pressures is disadvantageous, in particular in terms of the operating costs of the production plant because it requires the use of more energy.

Therefore, the need is felt to improve blow molds to prevent the risk of generating defects in the blown containers while keeping the production ranges high and the blowing pressures low.

SUMMARY OF THE INVENTION

It is an object of the present invention to provide a blow mold for making containers made of thermoplastic material, in particular PET bottles, which resolves the problems mentioned above.

These problems are solved by a blow mold for making a thermoplastic container having a predetermined wall thickness which, according to claim 1, comprises at least two half-molds and a mold bottom, which in a closed position, form the blow mold, wherein the mold has an inner surface shaped to mold the outer surface of the container, wherein said inner surface of the mold comprises one or more cavities and/or projections shaped to form corresponding respective projections and/or cavities of the outer surface of the container, wherein the mold further comprises one or more venting grooves communicating with the exterior of the mold, formed as a recess of the inner surface, arranged along an edge delimiting said cavities or projections, and in which each venting groove has predefined width and depth such that, for each venting groove, the following relations with said predetermined wall thickness are met: wall thickness of the container/L$\geq$1/10 and wall thickness of the container/H$\geq$1/10.

A blow mold which has significant advantages is obtained due to the features of the invention.

The appropriate arrangement and the dimension of each venting groove, or channel, having the aforesaid depth and width ensures a faster and more effective evacuation of the air during the production and blowing process, therefore a lowering of the pressure required for the standard cycle used for making thermoplastic containers is obtained.

Each venting groove can communicate with the exterior of the mold by means of venting holes arranged along the groove. In addition or alternatively to the venting holes, each groove communicates with the exterior as it has at least one open end which opens out in such a manner to be in fluid communication with the exterior of the mold. For example, the groove can open onto the contact surface of the half-molds and/or the mold bottom, the so-called "parting line" of the mold, which is well known to those skilled in the art. While the dimensions of the containers to be blown being equal to the solutions of the background art, the reduced pressure required for the blowing cycle with the mold of the invention implies the use of compressor devices for compressing the air having less power which corresponds to energy-saving and therefore also to economic saving.

Not less importantly is the advantage of succeeding in obtaining more defined details and elaborate geometries which replicate the pattern of the container more accurately.

Molds according to the invention can be easily customized on the outer shape of the container according to the needs of the clients.

The channels along which the venting holes can also be possibly arranged can be made in any area of the mold bottom and the container body depending on the areas in which "air locks" may be formed between the blown PET wall and the inner wall of the mold during the blowing. The areas where the venting grooves have to be made and the shape thereof are selected so that such channels may be better aesthetically "camouflaged" and so as not to damage the appearance of the container while avoiding leaving visible marks during the deformation of the wall of the container against the inner surface of the mold. In particular, it is preferable, but not necessary, to make the venting groove, or the venting grooves, along a path where there is a change in concavity of the inner surface of the mold at least in certain stretches of the path. For example, it is preferable to make a venting groove along an edge of a protrusion or a recess of the inner surface of the mold. Another area of the inner surface of the mold where it is preferable to make one or more venting grooves is the one designed to shape the area of the bottle where the label will be applied. It is worth noting that the grooves are distinct from the recesses and/or protrusions of the inner surface of the mold. It is also apparent that the mold bottom and the half-molds have a respective inner surface configured to shape the outer surface of the container.

The areas where air locks or blowing pockets are formed are typically identified during the design step of the mold thanks to computerized systems for predicting the dynamics of the expansion of the container during the course of the blowing operation, which depend on variables such as material, wall thickness of the preform and the final container, projections, or protrusions, and cavities, or recesses, of the body of the container to be made. This is a common design practice in this technical field which has been known now for decades.

A mold according to the invention having the venting grooves alone, or possibly also with the venting holes arranged along such grooves, or also with the venting holes arranged only in areas of the mold surface having large dimensions with respect to the diameter of the venting holes (as is known from the background art), allows the number of venting holes themselves to be decreased, thus avoiding the unwanted "holed" or dotted effect on the wall of the container, which appearance is not well accepted by the consumer and would be difficult to process. Moreover, such a dotting may also have negative consequences on the resistance of the finished container.

In the case of particular need, a mold according to the invention can additionally be provided with venting holes in other areas of the mold surface used in the prior art, thereby combining the solution according to the invention with the one known from the background art.

According to the invention, one or more venting grooves can be present on the inner surface of the mold bottom alone, on the inner surface of the half-molds alone, or on the inner surface of the mold bottom and on the inner surface of the half-molds.

The dependent claims describe preferred embodiments of the invention, thus forming an integral part of the present description.

BRIEF DESCRIPTION OF THE DRAWINGS

Further features and advantages of the invention will become more apparent in light of the detailed description of preferred, but not exclusive, embodiments of a blow mold, disclosed by way of a non-limiting example, with the aid of enclosed drawings in which:

FIG. 1 shows an axonometric view of a component part of the mold according to the invention;

FIG. 2 shows an axonometric view of another component of the mold of the invention;

FIG. 3 shows a plan view of a variant of another component of the mold of the invention;

FIG. 4 shows an enlarged sectional view of a detail of the component in FIG. 3;

FIG. 5 shows a sectional view of another enlarged detail of the component of the mold in FIG. 3;

FIG. 6 shows an enlarged detail of the section in FIG. 5.

The same numbers and the same reference letters in the figures identify similar elements or components.

DETAILED DESCRIPTION OF PREFERRED EMBODIMENTS OF THE INVENTION

Figure 8:
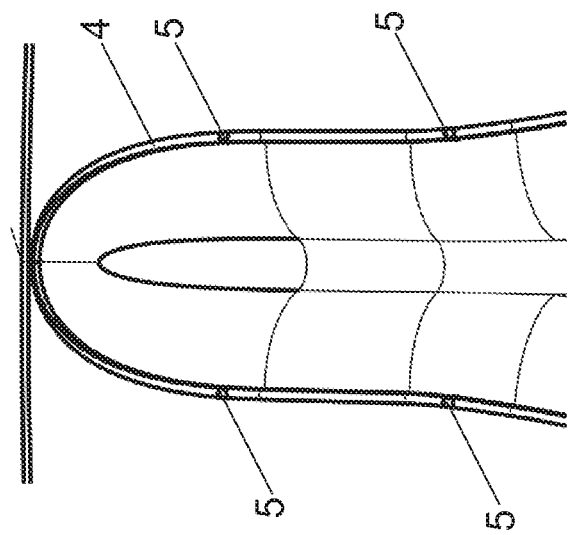
FIG. 8 shows an enlarged detail of a variant of the component of the mold of the invention in FIG. 7.

Further preferred embodiments of the blow mold for containers made of thermoplastic material are now described with particular reference to the above drawings. The mold of the invention is particularly suitable for performing a blowing operation together with a stretching operation in mainly longitudinal direction of preforms made of thermoplastic material. Moreover, the mold is particularly suitable for manufacturing a container for beverages made of thermoplastic material, preferably made of PET. The container is preferably a bottle.

FIG. 1 shows a half-mold 1. This half-mold 1 is designed to form the complete mold for a bottle, according to methods which are well known to those skilled in the art, together with the second half-mold (not shown), and the bottom mold for making the part corresponding to the base of the bottle, also commonly called mold bottom, of which two embodiments are shown in FIGS. 2 and 3. The inner surface of the mold is destined to come into contact with the outer surface of the container which is blown, so as to shape it to the shape of the final container. In particular, the inner surface 28 of the half-molds 1 serves to shape the body and the neck of the container, and the inner surface 29 of the mold bottom serves to shape the bottom of the container.

Although reference is made to a bottle, the invention also applies more generally to various types of containers. FIG. 2 and FIGS. 3 to 6 show two variants of mold bottoms 2, 3 of the mold, respectively, for bottles with various patterns, both conforming with the invention. In order to deform the wall of the container with the stretching-blowing to make the projections and the cavities provided in the bottle project to improve the appearance and structural abilities thereof, all three components of the mold, i.e. the two half-molds and the mold bottom, have cavities and projections with complementary shapes to those of the bottle. Without going into further detail on the design technique of the blow molds since this involves a technique which is known to those skilled in the art, a projection, or protrusion, in the inner surface of the mold corresponds to a cavity 11, or recess, in the finished bottle, and a projection 10, or protrusion, in the inner surface of the mold corresponds to a cavity, or recess, in the blown bottle.

In addition to the projections 10 and cavities 11, the inner surface 28, 29 of the mold destined to give the final shape to the wall of the blown container also provides one or more venting grooves 4, or channels, which are designed to channel air and to cause it to be released from the mold, but preferably which cannot leave a projected mark on the wall of the final bottle; in particular PET is processed, which is a highly deformable thermoplastic and is also adaptable to small projections or recesses in the mold.

In a further variant of the invention, there is provided one venting groove 4, or a greater number depending on the operating needs, on the inner surface of the mold, i.e., on the inner surface of the two side half-molds and of the mold bottom, along which venting groove 4 there are possibly also venting holes 5, as shown in the variant of the mold shown in FIG. 8. These venting holes 5, which communicate with the exterior of the mold, are similar to the ones which are commonly made in these molds of the known art to allow the air to be released from the mold during the expansion of the bottle wall to avoid air locks from remaining trapped between the wall of the container being formed and the inner wall of the mold.

Preferably, the diameter of each venting hole 5 has dimensions which are similar, but not necessarily equal, to the depth H and/or to the width L (FIG. 4) of the venting groove 4. Preferably, the diameter of the venting holes 5 is equal to or less than the width L of the venting groove 4. This eliminates the risk of visible marks remaining on the final blown container.

As said above, the venting groove 4 is made on the inner surface of the mold that creates the body of the container when the film of thermoplastic material deforms during the blowing operation. Such a venting groove 4 is adapted to the specific shape of the bottle. The shape thereof can follow a perimeter, or closed path, or can follow a continuous open or interrupted and/or communicating path with other grooves obtained in other parts of the mold.

In other words, when there are one or more venting grooves 4, the grooves can be distinct from one another or they can be in communication with one another thus forming a vent for the air, or some grooves which are separate from one another and some grooves which are in communication with one another, can be provided.

Each groove 4 can be arranged in the most suitable areas of the mold bottom 2, 3 or the half-mold 1 as a function of the pattern of the bottom and of the deformation dynamics of the wall of the preform, which expands during the stretching-blowing.

In particular, it is preferable, but not necessary, to make the venting groove 4, or the venting grooves, along a path where there is a change in concavity of the inner surface of the mold at least in certain stretches of the path. For example, it is preferable to make a venting groove along an edge of a protrusion 10 or of a recess 11 of the inner surface of the mold. Another area of the inner wall of the mold where it is preferable to make one or more venting grooves is the one designed to shape the area of the bottle where the label will be applied.

Certain, non-limiting examples of the preferred positions are along the outline of the base, the upper edge of the base, the petals, the pattern obtained on the support base, etc.

The grooves 4 can be applied to petaloid-shaped bottle bottoms or to flat, round or square bottoms, to all types of applications and shapes, by preferably following the perimeter or edge of such decorative or structural shapes. In light of the present description, the person skilled in the art is capable of selecting the areas where the grooves are made so they are as effective as possible, that is they provide an effective venting, and so that the bottle exactly replicates the shape of the mold according to the well-known principles of this field of the art.

For example, the grooves 4 can be applied to areas of the body of the bottle such as the shoulder, the side panels, the corner rounding, the gripping handles, insweeps, text/logos, etc. and also close to special "decorations".

The one or more venting grooves 4 are arranged in well-defined positions, which are determined during the design of the mold, and they can be applied to all particular geometries of the bottle. The drawings only illustrate, by way of example, certain areas where venting grooves can be obtained, but other areas of the surface of the container can also be selected according to the knowledge of the person skilled in the art who, during the course of designing a blow mold, should make the vents according to the expansion dynamics of the wall of the preform which expands and transforms into the final container.

For example, as shown in FIG. 2, the mold bottom 2 of the mold is provided with cavities 11 and protrusions 10, the latter being shaped like ribs. Main ribs 20, or first ribs, secondary ribs 22, or second ribs, and third ribs 24, or third grooves, are provided. The ribs 20, 22, 24 partly extend on the bottom portion and partly extend on the side portion of the mold bottom 2. The ribs 20, 22 are delimited by an outer edge where there preferably is a change in concavity of the inner surface of the mold. Groove 4 comprises stretches 43 arranged along a part of the edge of the main ribs 20 and of the secondary ribs 22, for example the part of edge on the side portion of the mold bottom. Moreover, groove 4 also comprises stretches 45 which transversely cross the third grooves 24. Moreover, groove 4 also comprises stretches 47 which extend substantially along arcs of a same circumference.

According to the invention, the stretches 43 and/or the stretches 45 and/or the stretches 47 can generally be provided independently from the specific shape of rib. When the three types of stretches are present (like in FIG. 2), they preferably alternate with each other.

Groove 4 can be provided with venting holes 5. At least one end of the groove opens onto the parting line 49 of the mold bottom also or alternatively to the venting holes 5, as shown for example in FIG. 3.

Only by way of example, the half-mold 1 in FIG. 1 provides a plurality of grooves 4. Each groove has two ends 41 which open onto the parting line 30 so that each groove is in communication with the exterior of the mold, and in particular so that the air channeled into the grooves 4 can be released. One or more grooves of the half-mold 1 can be provided with venting holes 5 as described above. The provision of the venting holes 5 can be an alternative or an addition to the fact that the grooves open onto the parting line. Moreover, the half-mold 1 preferably also has grooves which extend substantially along respective directions parallel to the longitudinal axis X of the half-mold.

In general, according to the invention, each groove 4 preferably has a dimension, in particular the length, which is much greater than the other two dimensions, in particular with respect to the width L and the depth H. Depth H is substantially the extension of the groove inside the inner wall of the mold. The length and width L are transversal to each other and to depth H. Preferably, the length of the groove is at least five times greater than the width L thereof and the depth H thereof. Even more preferably, the length of the groove is at least ten times greater than the width L thereof and the depth H thereof. Only by way of example, width L ranges between 0.1 and 2 mm, preferably between 0.3 and 0.5 mm. Only by way of example, depth H ranges between 0.1 and 2 mm, preferably between 0.3 and 0.5 mm.

Width L and depth H can have an equal or different extension from each other. Preferably, but not exclusively, the width L and/or the depth for each groove 4 remain constant along the extension in length of groove 4.

The grooves 4 preferably have depth H and width L which dimensions are such as to respect the ratios with the wall thickness of the final container (i.e. of the blown container): wall thickness of the container/L≥$\frac{1}{10}$ and wall thickness of the container/H≥$\frac{1}{10}$.

Advantageously, the venting groove 4, with any venting holes 5, ensures the venting of all the air present in the mold at the beginning of the blowing operation.

Thereby, the wall of the preforms is able to replicate the venting grooves during the stretching-blowing without the wall bending under the pressure of the blowing air, and without the wall is completely inserted into groove 4 while adhering to the inner part thereof, thus allowing air to be channeled between the bottom of groove 4 and the wall of the container. Generally, by using the dimensions that meet the aforesaid relations, visible deformations are avoided from being left on the container at the end of the stretching-blowing operation. Typically, by selecting such dimensional ratios, it is physically impossible for the expanding plastic surface to penetrate grooves which width and depth are so small to cause the steric impediment of the wall, which can bend with curvature radii which are not less than values known to those skilled in the art. Accordingly, due to the reduced dimensions of the grooves 4, they do not leave deformations of the container wall or marks of such small dimensions that are "invisible" or "camouflaged" to the naked eye amidst the grooves, the drawings and the ribs of the blown bottle.

The thickness of the walls of the thermoplastic containers made with the stretching-blowing generally ranges between a few tenths of microns and a few millimeters. Only by way of example, the wall thickness of the final container ranges between 0.1 and 2 mm. Typically, this thickness is predetermined in the design step.

The positioning of the venting grooves therefore occurs in the areas of the bottle mentioned above according to practical considerations, i.e. by selecting the areas where there is a need to create or increase the venting capacity, and to considerations based on appearance, i.e. by avoiding the mark of the grooves from being visible on the outer wall of the blown bottle and the container design from being invisible to the naked eye. Such selections are made by the designer also according to tests after which possible defects or visible flaws are visible on the blown bottles. Corrective measures are thereby introduced on the positioning of the grooves 4 and the venting holes 5. The diameter of the venting holes 5 is typically less than 1 mm, and advantageously can be reduced to a value of 0.3 mm. Preferably, the diameter of the venting holes 5 ranges between 0.3 and 0.5 mm.

Figure 7:
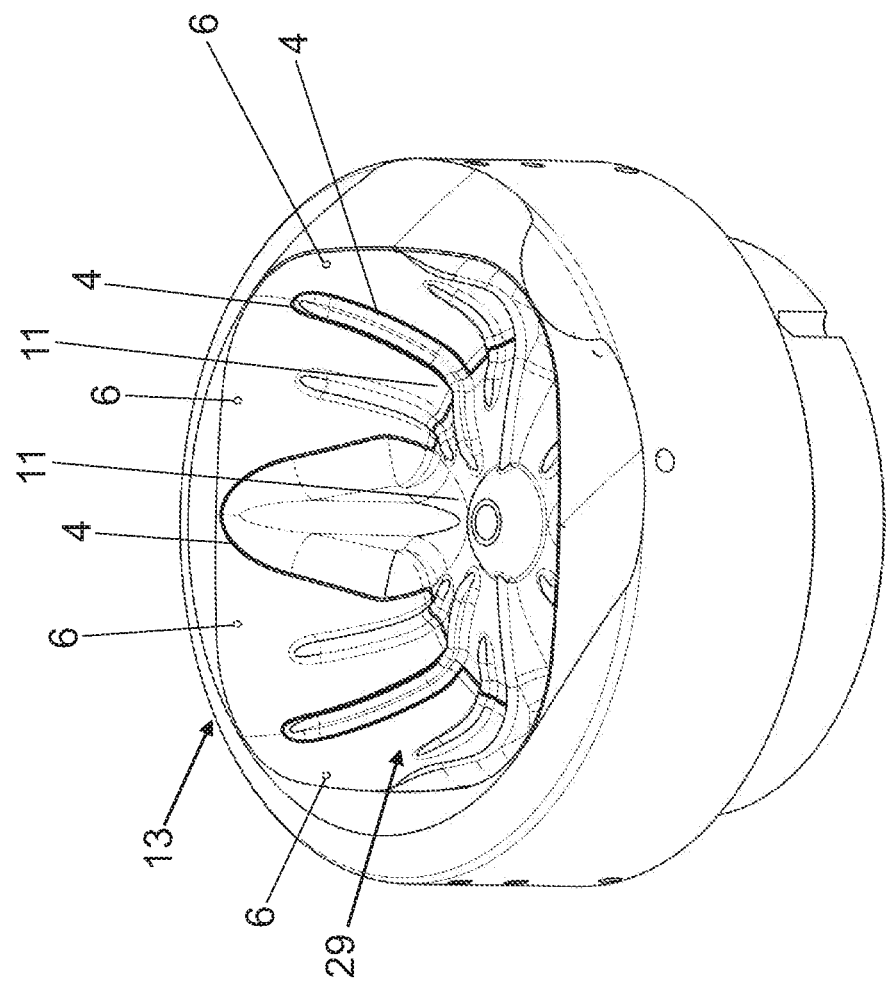
FIG. 7 shows an axonometric view of a further variant of a component of the mold of the invention.

As shown in FIG. 7, which shows another example of mold bottom 13 according to the present invention, it is also possible to make other holes 6, not inside the grooves 4, in positions where they are more effective for the successful operation of the stretching-blowing operation.

In a further variant of the mold of the invention, it is possible to make a mold in which there are venting holes 5 made along the grooves 4, which are combined with venting holes 6 in other areas of the outer surface of the mold, which are not along the venting grooves 4.

The blow mold of the invention can be made of aluminum, steel, copper, other metals or alloys used in this technology.

The elements and features disclosed in the various preferred embodiments of the apparatus of the invention can be combined without however departing from the scope of protection of the present application.

We claim:

1. A blow mold for blowing a thermoplastic container having a predetermined wall thickness, the blow mold comprising:
    at least two half-molds and a mold bottom, which, in a closed position, form the blow mold, wherein the blow mold has an inner surface shaped to mold an outer surface of the thermoplastic container,
    wherein said inner surface of the blow mold comprises one or more cavities and/or projections shaped to form corresponding respective projections and/or cavities of the outer surface of the thermoplastic container,
    wherein the blow mold further comprises one or more venting grooves communicating with an exterior of the blow mold, shaped like a recess of the inner surface, arranged along an edge delimiting said cavities or projections, and wherein each venting groove has a predefined width L and depth H such that, for each venting groove, the following relations with said predetermined wall thickness are met: wall thickness of the container/L≥$\frac{1}{10}$, and wall thickness of the container/H≥$\frac{1}{10}$.

2. The blow mold according to claim 1, wherein there is provided a plurality of first venting holes arranged along at least one groove of said one or more venting grooves, so as to be in communication with the exterior of the blow mold.

3. The blow mold according to claim 2, wherein each first venting hole has a diameter which is smaller than or equal to the width L of said at least one groove.

4. The blow mold according to claim 3, comprising one or more second venting holes areas of the blow mold different from said one or more venting grooves.

5. The blow mold according to claim 4, wherein the first venting holes and the second venting holes pass through a whole thickness of a blow mold wall.

6. The blow mold according to claim 1, apt to perform a blowing operation together with a stretching operation in mainly longitudinal direction of preforms made of thermoplastic material.

7. The blow mold according to claim 1, wherein each venting groove has a length which is much greater than the width L and the depth H.

8. The blow mold according to claim 7, wherein said length is at least five times greater than said width L and said length is at least five times greater than said depth H.

9. The blow mold according to claim 1, wherein said width L ranges between 0.1 and 2 mm.

10. The blow mold according to claim 1, wherein said depth H ranges between 0.1 and 2 mm.

11. The blow mold according to claim 1, wherein at least one groove of said one or more venting grooves opens onto a parting line of the mold so as to be in communication with the exterior of the mold.

12. The blow mold according to claim 1, wherein said edge is an area in which there is a change in concavity of the inner surface of the blow mold so as to camouflage a mark of a print left by said one or more venting grooves.

* * * * *